April 16, 1940.                B. J. WITT                 2,197,027
                            ELECTRIC CABLE
                         Filed Feb. 27, 1937
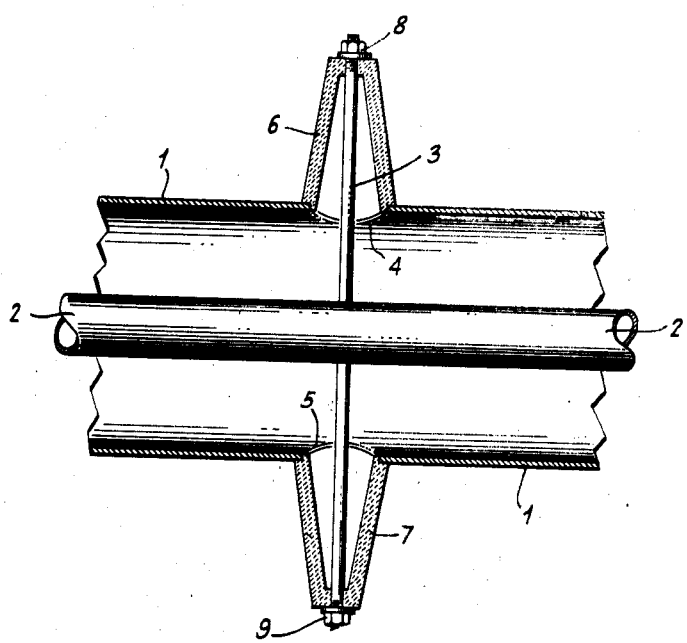
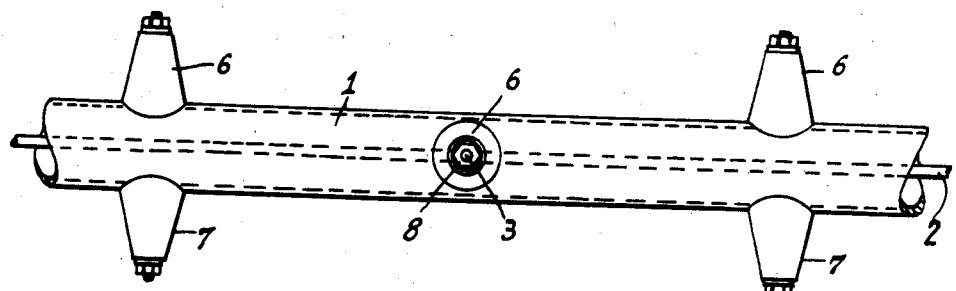
INVENTOR
BERTRAM JOHN WITT
BY
ATTORNEY Patented Apr. 16, 1940

2,197,027

UNITED STATES PATENT OFFICE 2,197,027

ELECTRIC CABLE

Bertram John Witt, Harrow, England, assignor to Radio Corporation of America, a corporation of Delaware Application February 27, 1937, Serial No. 128,044
In Great Britain February 27, 1936

8 Claims. (Cl. 174—28)

This invention relates to electric cables and more specifically to concentric tubular cables for transmitting high or radio frequency energy, e. g., from a transmitter to an aerial system.

The invention has for its object to provide improved high frequency cables of the so-called concentric tubular type which shall be such that a minimum of electrical reflection effects occur therein.

Concentric tubular high frequency cables as at present in common use, comprise an outer tubular conductor which surrounds a centrally supported inner conductor which is, as a rule, supported and insulated from the outer conductor by means of uniformly spaced insulators between the said inner and the said outer conductor. With such a known construction, there are relatively abrupt changes in the impedance of the cable where the insulators occur and electrical reflection effects accordingly occur at these places. Where a fairly long cable of this known construction is employed, to transmit energy to a load, such as an aerial, the combined effect of the large number of insulators at each of which reflection occurs, is to produce a variable load across the output of the transmitter, and while for ordinary broadcast radio practice, this variation is not a serious matter, where the transmission of widely modulated short waves is in question, e. g., in television transmission systems, the said variation assumes a real importance. As will be seen later, the present invention provides improved high frequency cable structures of the tubular concentric type wherein reflection effects are substantially eliminated or greatly reduced, as compared to known high frequency tubular cables of equivalent size.

According to this invention, the inner conductor in a concentric tubular high frequency cable is supported from the outer conductor by means including a plurality of spaced metal support members which extend from the inner conductor to insulators carried by the outer conductor and wherever there is a support member located, the inductance of the outer conductor is increased by the metal support members cutting the field between the inner and outer conductor to such an extent as substantially to counterbalance the effect of the increase in capacity due to said support member acting as an electrode of a condenser directly connected to the inner conductor and in capacitive relationship with the outer conductor which forms the other electrode. In this way, it is possible to obtain a high frequency concentric tubular cable in which the ratio of inductance to capacity is maintained substantially uniform all along the cable, i. e., in which there are no serious abrupt changes of impedance where the inner conductor is supported.

Preferably, the insulators are made hollow and mounted externally on the outer conductor so that they are outside the strong portion of the field set up in the said conductor. This arrangement has the advantage that dielectric losses are minimized and accordingly insulators of long leakage surface can be used.

Preferably, also, the metal support members are constituted by simple metal rods spaced along the cable, successive rods being placed at right angles to one another so that proper centralized support for the inner conductor is obtained.

The invention is illustrated in the accompanying drawing in which Fig. 1 shows in longitudinal section a short length of cable in accordance with the invention. Fig. 2 shows in elevation a staggered arrangement of the conductor supports.

Referring to the drawing, the high frequency concentric tubular cable therein illustrated comprises an outer cylindrical tubular conductor 1 and an inner cylindrical tubular conductor 2. The inner conductor is concentric within the outer conductor and is supported therefrom by means of brass or other suitable metal rods, such as 3, passing therethrough, the rods being spaced apart along the length of the cable and successive rods being at right angles to one another as shown by Fig. 2. Each rod (only one is shown in Fig. 1) is diametrical with respect both to the inner conductor 2 and to the outer conductor 1, and where the ends of the said rod pass through the outer conductor 1 the said outer conductor is cut away to increase its inductance and decrease its capacitance at that point. For example, as shown, it may be provided with two equal oppositely disposed apertures 4, 5, one end of the support rod passing centrally through each aperture. Seated upon the rim of each aperture and arranged externally of the outer conductor is a hollow conical insulator 6 or 7 the base of which seats against the rim of its appropriate aperture and the crown or apex of which is formed with a boring to receive the appropriate end of the rod. Thus, each rod passes at each of its ends into and through a hollow conical insulator 6 or 7. The ends of each rod are threaded and wing or other suitable nuts (ordinary nuts 8, 9 are shown) are screwed thereon, these nuts bearing through suitable washers against the crowns of the conical insulators 6, 7, to provide rigid support and press the said insulators against the outer conductor 1. The position of the inner conductor relative to the support rods may be fixed in any convenient way not illustrated, e. g., by nuts screwed upon the support rods or by spacing distance pieces or the like.

It will be seen that with the construction illustrated and above described, it is possible by a suitable proportioning of the parts to make the increase of the inductance of the outer conductor near each support rod substantially counterbalance the increase in capacity due to the capacitive relationship of said support rod and the outer conductor, and in this way the cable may be caused to have a substantially uniform ratio of inductance to capacity throughout its length. For example, if one considers a metal sheet as composed of strips, then the inductance of the sheet can be considered as the resultant value of all the strip inductances. If some of the strips are removed, the resulting inductance must increase, so that if a hole 4 is cut in the outer concentric feeder 1, then the inductance of the section in the neighborhood of the hole will increase. The capacity of the section is increased by the brass rod 3 passing through the hole 4 so that by suitable choice of sizes of hole and rod the ratio $$\sqrt{\frac{L+\delta L}{C+\delta C}}$$

could be made equal to $$\sqrt{\frac{L}{C}}$$

i. e., $\dfrac{\delta L}{L} - \dfrac{\delta C}{C} = 0$ and thus the surge impedance of the feeder would remain constant over this section. Furthermore, the insulators are outside the field set up in the outer conductor due to the passage of high frequency currents therethrough.

What is claimed is:

1. A concentric tubular high frequency cable comprising an inner and an outer conductor, said outer conductor having a plurality of apertures therein, said apertures arranged alternately in groups of two and at right angles to an adjacent group, each aperture in a group being located diametrically opposite the other, an insulating member located outside each aperture and a metallic rod secured to each of the insulating members of each group and diametrally arranged with respect to said inner conductor, the size of said apertures being such as to increase the inductance of said outer conductor to counterbalance the increase in capacity between said inner and outer conductors due to the presence of said metallic rod.

2. A concentric tubular high frequency cable comprising an inner and an outer conductor, said outer conductor having a plurality of apertures therein, said apertures arranged alternately in groups of two and at right angles to an adjacent group, each aperture in a group being located diametrically opposite the other, an insulating member located outside each aperture and a metallic rod secured to each of the insulating members of each group and diametrally arranged with respect to said inner conductor for retaining said conductors in concentric relationship with each other, the size of the apertures in said outer conductor being so related to the transverse dimension of said metallic rods that the ratio of inductance to capacity of said cable is maintained constant throughout its length.

3. A concentric tubular high frequency cable comprising an inner and an outer conductor, said outer conductor having a plurality of apertures therein, said apertures arranged alternately in groups of two and at right angles to an adjacent group, each aperture in a group being located diametrically opposite the other, a hollow insulating member located opposite each aperture and a metal rod passing through each of the insulating members of each group and secured to said inner conductor for retaining said conductors in concentric relationship with each other.

4. A concentric tubular high frequency cable comprising an inner and an outer conductor, said outer conductor having a plurality of apertures therein, said apertures arranged alternately in groups of two and at right angles to an adjacent group, each aperture in a group being located diametrically opposite the other, a hollow insulating member located outside each aperture and a metallic supporting member passing through each of the insulating members of each group and through said inner conductor for retaining said conductors in concentric relationship with each other and means for retaining said insulating members in position.

5. A concentric tubular high frequency cable comprising an inner and an outer conductor, said outer conductor having a plurality of apertures therein, said apertures arranged alternately in groups of two at right angles to an adjacent group, each aperture in a group being located diametrically opposite the other, a hollow conical insulating member having its base spanning each aperture and a metal rod diametrally arranged with respect to said inner conductor and passing through each of the insulating members of each group for retaining said conductors in concentric relationship with each other and means for retaining said insulating members in position.

6. A concentric tubular high frequency cable comprising an inner and an outer conductor, said conductors having a plurality of apertures therein, means for insulatingly maintaining said conductors in concentric relationship, said means comprising a plurality of metallic members passing through the apertures in both the inner and the outer conductors, with a plurality of insulation members located outside the outer conductor for securing said metallic members to the outer conductor.

7. A concentric tubular high frequency cable comprising an inner and an outer conductor, said outer conductor having a plurality of apertures therein, said apertures arranged alternately in groups of two and at right angles to an adjacent group, each aperture in a group being located diametrically opposite the other, an insulating member located outside each aperture, and a metallic member secured to each of the insulating members of each group and passing through said inner conductor for retaining said conductors in concentric relationship with each other.

8. A concentric tubular high frequency cable comprising an inner and an outer conductor, said outer conductor having a plurality of apertures therein, said apertures arranged alternately in groups of two and at right angles to an adjacent group, each aperture in a group being located diametrically opposite the other, a hollow insulating member located outside each aperture, and a metallic member pasing through each of the insulating members of each group and passing through said inner conductor for retaining said conductors in concentric relationship with each other.

BERTRAM JOHN WITT.